(12) United States Patent
Mangum

(10) Patent No.: US 9,818,280 B2
(45) Date of Patent: Nov. 14, 2017

(54) INSTANT PERSONAL EMERGENCY COMMUNICATION MESSAGING DEVICE

(71) Applicant: Mason Paul Mangum, Houston, TX (US)

(72) Inventor: Mason Paul Mangum, Houston, TX (US)

( * ) Notice: Subject to any disclaimer, the term of this patent is extended or adjusted under 35 U.S.C. 154(b) by 0 days.

(21) Appl. No.: 15/240,055

(22) Filed: Aug. 18, 2016

(65) Prior Publication Data

US 2017/0053509 A1 Feb. 23, 2017

Related U.S. Application Data

(60) Provisional application No. 62/206,512, filed on Aug. 18, 2015, provisional application No. 62/296,789, filed on Feb. 18, 2016.

(51) Int. Cl.
| | |
|---|---|
| *H04M 11/04* | (2006.01) |
| *G08B 21/02* | (2006.01) |
| *H04W 4/02* | (2009.01) |
| *H04W 4/22* | (2009.01) |
| *G08B 5/22* | (2006.01) |
| *H04L 12/58* | (2006.01) |
| *H04W 4/14* | (2009.01) |

(52) U.S. Cl.
CPC ......... *G08B 21/0269* (2013.01); *G08B 5/226* (2013.01); *H04L 51/04* (2013.01); *H04W 4/02* (2013.01); *H04W 4/14* (2013.01); *H04W 4/22* (2013.01)

(58) Field of Classification Search
CPC ..... H04W 4/22; H04W 4/008; H04W 76/007; H04W 4/021; H04W 4/12; H04W 88/02; H04W 12/06; H04W 12/08; H04W 76/02; G08B 25/008; G08B 25/016; G08B 15/004; G08B 21/02; G08B 21/0269; G08B 21/0272
See application file for complete search history.

(56) References Cited

U.S. PATENT DOCUMENTS

| | | | | |
|---|---|---|---|---|
| 2005/0282563 | A1* | 12/2005 | Wardimon | G06Q 10/107 455/466 |
| 2009/0264093 | A1* | 10/2009 | Rothschild | G08B 25/001 455/404.2 |
| 2009/0322521 | A1* | 12/2009 | Jacobson | H04L 63/102 340/540 |
| 2010/0075628 | A1* | 3/2010 | Ye | H04W 76/007 455/404.2 |
| 2015/0304463 | A1* | 10/2015 | Rynk | H04M 1/026 455/575.1 |

\* cited by examiner

*Primary Examiner* — Kwasi Karikari
(74) *Attorney, Agent, or Firm* — Braxton, Hilton & Perrone, PLLC

(57) ABSTRACT

An instant personal emergency messaging platform in which message content is represented and transmitted via a single operation with the operation invoking a coding of geographic location and status data used to confirm the location and status of an individual.

20 Claims, 4 Drawing Sheets

INSTANT PERSONAL EMERGENCY COMMUNICATION MESSAGING DEVICE

This Application claims priority to U.S. Provisional Application No. 62/206,512 filed Aug. 18, 2015 and U.S. Provisional Application No. 62/296,789 filed Feb. 18, 2016 and are incorporated in their entirety herein by reference.

TECHNICAL FIELD

This disclosure relates generally to a system and methods for a personal and group instant personal emergency messaging system incorporating global positioning system (GPS) technology and customizable message delivery features enabling fast and accurate information concerning a participant's location and status. The system advantageously includes various functionality to provide users with readily ascertainable and discernable information concerning a person's location in situations where the person's safety is a concern. A monitoring person, such as a parent, receives messages that are coded to indicate whether a child has arrived, is near, or is en route to an expected location. In addition, messaging between group members may be color coded to designate status. In the alternative, a wordless message alone may be indicative of a status based on known message parameters between users. The present system is advantageous in that multiple messages may be sent and the content of those messages may be deciphered quickly primarily based on the look of the message rather than content. This greatly reduces the time spent on and distraction caused by preparing, sending and reading and responding to received messages, which provides more efficient exchange of information and user safety.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DESCRIPTION OF THE EMBODIMENTS

Figure 2:
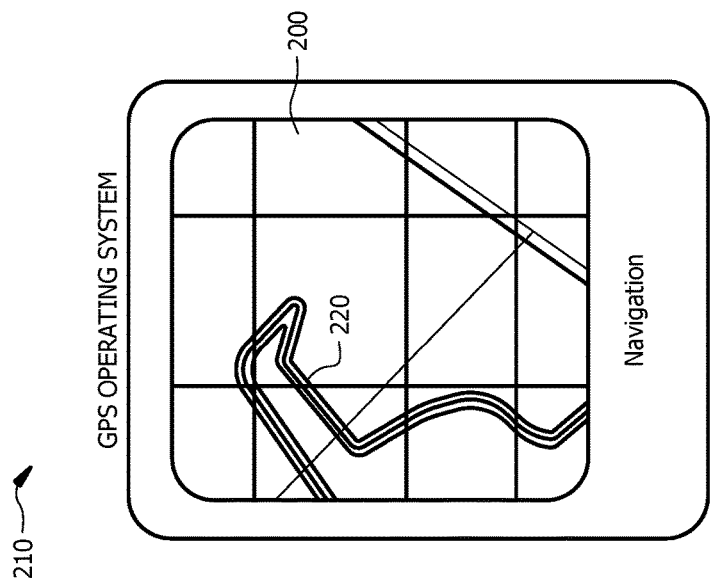
FIG. 2 depicts a user interface provided on a mobile device for receipt of a message sent by a user depicting the sender's location and status according to an embodiment of the present personal communication system.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

The present invention operates in one embodiment as a mobile phone application but could use any personal computing device with wired or wireless capabilities as a platform. The instant personal communication system is designed to provide individuals with a personal and customizable level of security and communication that provides enhanced safety and security during those situations where threats have been identified. Preset notifications are customizable and automatically sent to the user's emergency contacts in the form of a text message, email, and an automated pre-recorded telephone call created by each user. The severity of each crisis and the immediate needs of the individual(s) are based on a green, yellow and red color pattern format.

This present personal and customizable instant personal messaging system effectively provides a new platform for virtually instant two-way communication based on a color-coded operating system along with accurate GPS Location services that gives users a more reliable way to communicate faster, more efficiently and allows its users to receive and transmit more information while performing fewer operations on the user device. The system combines the functionality of an effective personal and customizable security with social communication. This allows users the ability to have complete knowledge of the status of others of interest and allowing protection of oneself by communication though a single or synced instant emergency messaging service. The customizable message notification capability of the present system provides users with the ability to select and modify message content and appearance according to each individual user's objectives.

In one embodiment of the present instant personal emergency notification system, the importance of a communication or status in indicated by color. In the child safety functionality of the present system, a green, yellow, and red color pattern is invoked for several daily activities serving multiple different levels of personal security and social communication. The color green is used to symbolize positive messages such as "Yes", "Go", "safe" and "happy". The color yellow is used to symbolize uncertainty or caution such as; "maybe", "50/50", "medium", "middle" and "I don't know". The color red is used to symbolize negativity or danger such as "NO", "stop", "emergency" or "conflict", and the like.

A beneficial feature that the present system provides to user is opportunity and peace of mind. Users and customers can effectively use the instant personal emergency messaging system to serve their daily needs in numerous ways throughout their daily activities. The present system provides back up safeguards to ensure that an urgent message is received. This default feature is achieved through a user's contact information widely available through various mobile communication devices. If message is sent through the present system and no confirmation of receipt is received by the user according to the confirmation receipt parameters set by the user of the sending device, such as a time lapse during which no response is received. If no response is received by the lapse of the designated time period, the message will be re-sent this time to the device of the contact of the user designated as the second contact. This process will continue with re-sending of the message down the list the user designates as the third, fourth, fifth, etc. back up recipient until a recipient confirms and acknowledges receipt of message by replying "Y" for yes in the form of a text message. Messages are sent to desired recipients through known push technology techniques or other suitable transmission methods. This default system ensures that if the user is in an emergency situation and could only send a single brief message, then the system will continue to send the emergency message without the user under duress searching through contacts to re-send.

The presently described system resolves problems associated with traditional texting or calling by providing simple messaging capability to accommodate various situations. One in a threatening situation can deploy a message virtually instantly and receive help and if the intended recipient does not respond, subsequent designated recipients may be notified.

Figure 1:
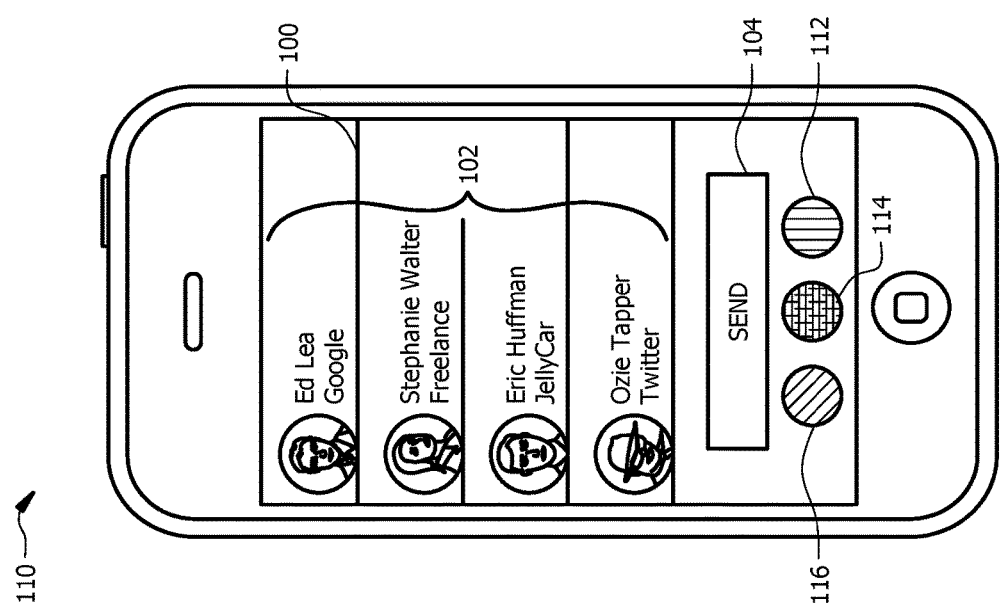
FIG. 1 depicts a user interface provided on a mobile device for entry of messaging selections according to an embodiment of the present personal communication system.

FIG. 1 depicts an embodiment of the user interface 100 on a smart phone 110. The red 112/yellow 114/green 116 messaging keys appear along with various contacts 102 of the user. The list of contact 102 appearing on the device screen were selected by the user from a group of general contacts or a group previously designated to receive messages through the emergency messaging system. Once a list of recipients is selected, the message, such as a green message indicating a positive message, is sent by depressing the "send" key 104 to the devices of the individuals listed. This communication may be either through email, text message, voice call, social media outlet or other protocol where the user contact identifier is linked to an address of that user for receipt of such message. As discussed above, in the event of a duress situation where a responsive message is sought, the system may be in duress or emergency mode where a red message denoting danger may be sent to the first person on the list. In the event the first recipient does not respond to the red indicator within a designated time period, the message is re-sent to the second contact on the list 102 and so on until acknowledgement is received by the sender. This eliminates the need for the user to have to manually retrieve contact information and re-create a message. The user may also designate receipt of messages through a social media platform, such as Facebook, Twitter and the like. Users may also designate police, fire department or EMS as the "last resort" recipient of a message in the event the list of individual recipient list is exhausted without response after a predetermined number of attempts.

In another embodiment, the messaging features of the present system are coupled to GPS navigation and capability to provide fast and accurate personal status and location information and instant pre-set social communicated messages. Messaging may be achieved through push notification technology (Green, Yellow) or an Amber Alert (RED) type of message depending on the user's current situation. By example, a child traveling to a friend's house by bicycle may be instructed by a parent to send to the parent periodic status messages while in transit to the destination in addition to a message upon arrival. Before departing or at the time of messaging, the parent may be selected as the recipient of a location status message. Periodically while in transit, the child may send the parent one of a red/yellow/green message through an interface such as that described in FIG. 1 by depressing red indicator key 112, yellow indicator key 114 or green indicator key 116. If the child stops to message and is fine, the child will depress the green indicator and send the message to the parent. Upon doing so, the parent will receive a message such as that shown in FIG. 2. FIG. 2 is the user interface 200 of the receiving device 210, in this case of the parent, upon receipt of the child's message in this scenario. Through incorporation of GPS capability through a GPS antenna in the child's and parent's device, the child's green message is displayed to the parent as a map 220 identifying the location of the child from where the message was sent, with the map shaded green to give the general indication that the child is fine. This provides a quick indication to the parent of the safety and location of the child and avoids the onset of panic.

The send operation may be achieved by depressing a separate "send" key 104 as shown in FIG. 1 after color designation is selected. Alternatively, the message may be sent upon depressing the color key 112, 114, 116 alone. To prevent inadvertent transmission, the device settings may be set to require the user to continuously depress the key (either color for single action send or send key) for a defined period to invoke transmission.

On the other hand, if the child has difficulty, such as a mechanical problem with his bike he may send a yellow message that results in a message to the parent such as that of FIG. 2, except the map 220 may be shaded yellow. In response the parent can call the child or travel to the child's location. In the event the child is injured, fearful or unfortunately apprehended and has the opportunity to message the parent, the child may send a red message, which will be received by the parent as a map depicting the child's location with the map 220 shaded red. At that point the parent may contact the proper authorities and travel to the shown location.

In another embodiment of the present personal messaging system, messaging and GPS functionality operate together to provide convenient navigation information. By example, if multiple system subscribers plan to meet at a restaurant and some attendees do not know the location, the first arriving user may activate navigation and send a green indicator to the other attendees selected from the user's contacts. Upon depressing the green button 116 such as depicted in FIG. 1, the recipients will receive a map of the location of the sends (at the restaurant) with navigation instructions. Thus, through a single operation by the user at the destination, the traveling users have navigation information available without them entering an address or place name while driving or otherwise. The traveling users may also synchronize the mobile device to the vehicle navigation system for more convenient receipt of navigation instructions. Through this capability, users are provided with a safe means for communicating directions without placing the driving user in danger by entering navigation information into the mobile device or vehicle navigation device.

Along these lines, the personal navigation features of the present system allows the user in transit to provide a single button response to an inquiry. A user at a destination awaiting the arrival of another user may query whether the traveling user will arrive by a planned time. Through the personal messaging system, the user may select arrival mode to make the query by depressing the green key. The traveling user, in response, may respond by depressing the yellow key or verbalizing the word "yellow" to send the yellow response to the query, meaning that there is a "50/50" chance that the traveler will be on time. The GPS capability coupled to this response will send the requester a location message in the form of a map depicting the traveler's location shaded in yellow indicating that it is 50/50 that the traveler will arrive on time.

Even in the simplest of contexts, users may communicate quickly, efficiently and discretely. A child in need of communicating her status with a parent or guardian may be embarrassed to do so in the presence of others. The present system in standard communication mode allows one action transmission of a green message from the child to the parent indicating that the child is fine. Additionally, in location status mode the child's message will be received with a shaded map depicting the location of the child. In an alternative embodiment of location status mode, the parent may enter the expected location of the child and regardless of the response of the child, the map of the child's location depicted on the parent's device will be shaded according to whether the child is actually at the expected location. For example, if the child is to be at the local library, with the child's green message indicating she is fine, the parent will receive a shaded map with the response indicating location. If the child is not at the library, the child's current location will appear on a map shaded, for example, yellow or red. Upon receipt the parent may act accordingly.

In other contexts, a single operation may facilitate transmission of a predetermined message between adults. For example, in standard communication mode a couple may know that a green message means "I love you" or a red message may indicate "I'm angry at you." Similarly, friends may communicate via single color coded key messaging in a variety of contexts. Friends watching a live sporting event between rival teams may send messages during the course of the game based on predetermined meanings. A green message may indicate "great play" or a red message may indicate "your team is lousy." Multiple user settings may be designated to send messages of various meanings with a single operation.

Users of the present personal messaging system may also create prepared customized message that are transmitted via the single red/yellow/green operation. The pre-created messages may be in textual or audio format, or both. Thus, when a user, such as a driver needs to send a message to a contact the user may be in short message mode. This mode and the associated message is driven by the context in which the message is sent. The user may set multiple contexts in advance within short message mode, typically dictated by the user's schedule. For example, a frequent air traveler may designate the message "My flight is delayed" as a red message under the "Flights" context of short message mode. Under this same context, a green message may be designated as "Just landed. On my way home." Similarly, a spouse at the grocery store may invoke the shopping context. A red message may be associated with the message "I'm leaving the store. Let me know if you need anything." In this short informative message context, the recipient may only receive the text underlying the color key of sent message rather than a shaded map or color only message. Particular customized messages associated with a color may be associated with a single or multiple communication context and multiple particularized messages may be created.

Business users may associate advertisements or other multimedia messages, such as jpeg files, .mpeg files or audio files with a color coded key according to the associated context.

Figure 3:
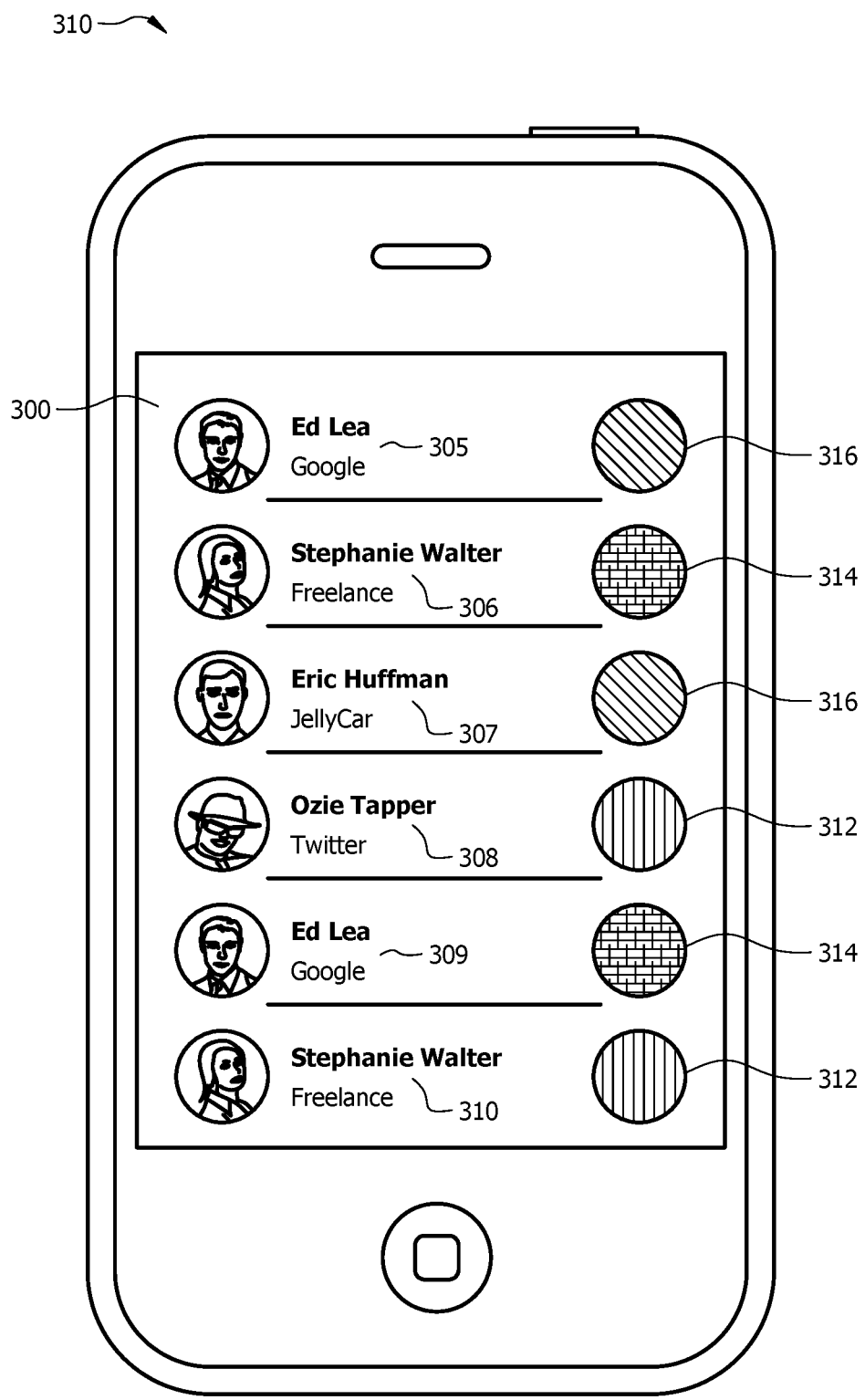
FIG. 3 depicts a listing of system members associated with the user with each entry coded according to a communication designation according to an embodiment of the present personal communication system.

In the user interface 300 of device 310 depicted in FIG. 3, various contacts 305, 306, 307, 308, 309, 310 are depicted with one of three color indicators: red 312, yellow 314 and green 316. In one embodiment of the present system, the user may designate contacts as recipients of particular messages based on the urgency of the message. This may arise when a parent sets the child's phone for intended recipients for emergency messages. In accordance with the messaging process described above in which a message is re-sent if a timely response is not received, the re-sending process may proceed according to the color code assigned to a contact. As shown in FIG. 3, if a person sends a red "danger" message, it will first be sent to Ozie Tapper 308 and if a timely response is not received, the next contact designated as a red contact, Stephanie Walter 310, will receive the red message. If only two contacts are designated red, the user may set the system for transmission to contacts designated as yellow contacts once red designees are exhausted according to the same re-sending process described above, followed by transmission to green contacts once yellow contacts are exhausted. The system will optionally send a reminder message to recipients of an original message via a communication format other than the originally transmitted message. For example, if a user sent a red message to another via text that went unanswered, the recipient will receive an e-mail or voice message reminder that the original message requires a response.

Users of the present instant personal emergency messaging system will individually create their own personal user profile page. The profile will include the user's permanent address and billing address, city, state, zip code, phone number and cellular provider associated with each user's personal account. Other information may include DOB, race/ethnicity, gender, age and a profile picture. Users will have the ability to customize each message to their individual needs and likeness, while also being able to prioritize emergency and social communication contacts in order of preference following the green, yellow, and red color protocol. In addition, family members and/or friends of all ages will be able to sync together their respective mobile and desktop devices. This functionality allows all parties to communicate together and be in sync with one another similar to a group message. Users may also individually select other users who may be members of their system club and successfully collaborate and communicate with whom they choose and when they choose. Similarly, the system may be used among family members including extended family while at a theme park or other widespread location in order to ascertain the whereabouts of various members and meeting at a particular location using functionality similar to the restaurant locator scenario employing GPS as described above. For large groups employing the instant emergency messaging system, such as corporate groups, an administrator may receive analytics reflecting overall system performance, usage on a group-wide and individual basis and responsiveness to better customize user experience within the group.

User access of the messaging system may be restricted through use of typical log in credentials, such as a user account name, email address and password. Users may invite other system users to be messaging recipients and vice versa, and the invitee's acceptance results in the user becoming part of the user's group.

Elderly individuals may also employ the color coded messaging system in providing instant messaging to care givers or family members in the event of a medical emergency. The message sent by the elderly individual may be sent and re-sent according to the previously described method and coupled with location information. Optionally, the messages may be assigned to a complication related to a particular medical condition through the messaging customization feature as described.

The user will download an application to a mobile device such as a smart phone to carry out the functionality of the instant personal emergency messaging system. The application allows for GPS tracking of the user's device and navigation capability in conjunction with transceiver capability of the device and know push notification techniques to ensure efficient message delivery.

Users may purchase single color coded message capability, for example green only, combinations of color coding, or all the suite of all three codes. A portion of proceeds generated by service providers may be dedicated to charity or otherwise, with the user receiving indication that such charitable donation has been made. Users may be charged a flat fee for purchase of one or more codes or be charged on a subscription basis or based on a level of use of each code. A basic push based single key notification system without color coding may be provided at no charge via download of the basic application, while purchase of a premium or upgraded package unlocks additional functionality as described in the various embodiments. Subscription or flat fees may also be charged based on the number of recipients added to a user's network.

The user will have access to a log that reflects the user's history of received messaging and sent messaging, along with a listing of frequent responders to messaging and the alert level of the messages to which a response was received.

The user may control the type of messaging sent according to the color coded key depressed. A user may wish a red message, typically reflecting urgency or danger, to be sent to most or all of the communication platforms of the recipient, such as email, text messaging, social media platforms, cell phone call, land line phone call, etc. For messages of lesser urgency, transmission to only certain of these communication platforms of the recipient may be designated.

Through a user dashboard presented to the user via the transmitting device or other device through which the user may log in. This dashboard enables users to import contacts previously stored on the user's device(s) and invite others to become contacts. The user may also group contacts according to the context to which certain messages may pertain. The dashboard also enables the user to create customizable messages and associate those message with a color coded key and relevant context(s). A user may also set a time and date at which a particular designation may expire. By example, a contact may only be associated with a context or customized message for a finite duration. Similarly, a customized message may be based on a current event and become stale with the passage of time. Accordingly, that message may be set to automatically deactivate based on a time set by the user via the dashboard. Even if deactivated, however, the message will remain for historical reference or later re-activation.

Messaging and all associated functionality may be activated by voice commands rather than manual activation of a single key operation. This is advantageous by a user in transit of a user with physical limitations.

Figure 4:
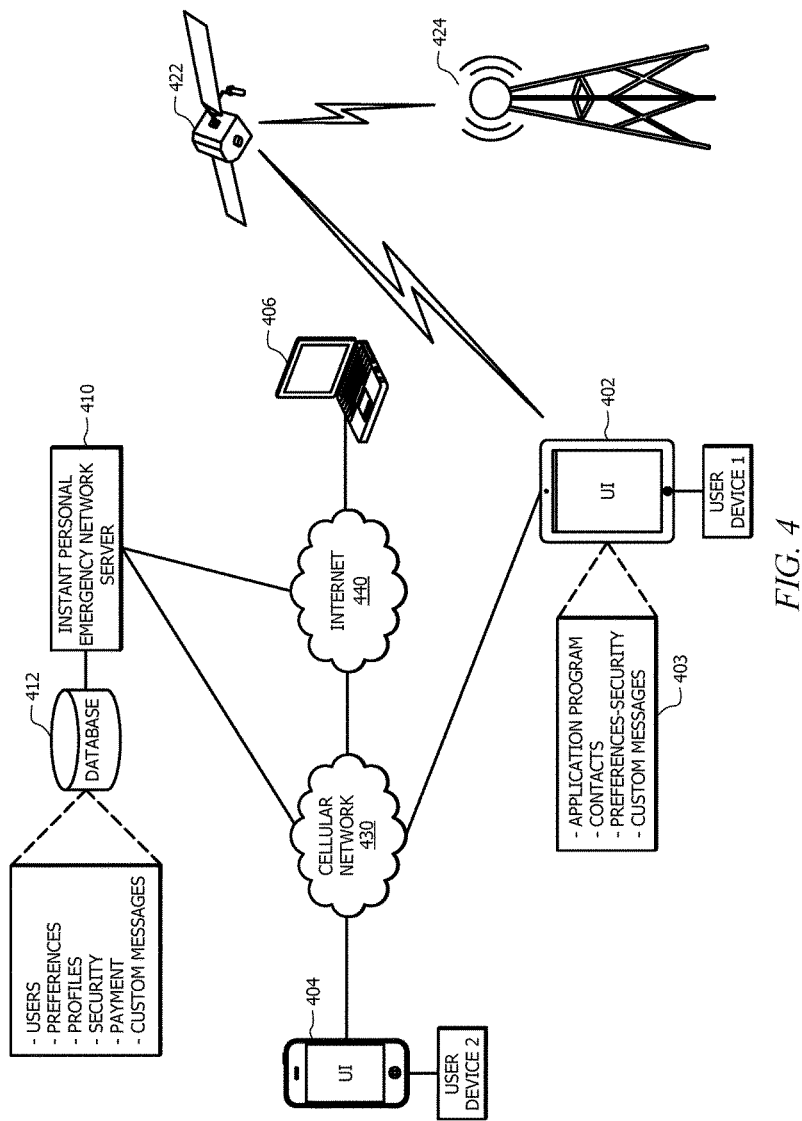
FIG. 4 is a network diagram depicting user device communication according to an embodiment of the present communication system.

The presently described instant personal emergency messaging system may be part of a communication network as depicted in FIG. 4. In FIG. 4, multiple user devices 402, 404 and 406 are smart phones 402, 404 and a laptop computer or personal digital assistant 406, through which users may download an application program executable through the device operating system to permit use of the features and functionality of the present emergency messaging system. The application program is stored in memory 403 associated with the user device. Also stored in local memory 403 are user contacts, preferences designated by the user for communicating in a desired manner through the present system, customized messages for delivery in select contexts and security settings such as a password for user access to the present messaging system through the user's device.

It is assumed that each user device 402, 404 and 406 is enrolled as a device participating in the present messaging system. User devices 402 and 404 communicate with each other via a carrier network such as a cellular network 430 and may be in further communication with other devices via the Internet 440 or public switched telephone network (not shown). User device 406 is one such device that may communicate with smart phones 402 and 404 via the Internet. An Instant Personal Emergency Network Server 410 is networked with the user devices via the Internet and/or cellular network. Database 412 is associated with server 410 in which subscriber user data is stored. This data includes user profiles, preferences, payment information, security passwords, customized messages and the like. A user' selection at the user device of various preference or updates to a previously established profile may be stored locally at the device as well as in server database 412.

A satellite 422 is in communication with user device 402 that is equipped with a GPS antenna. GPS software enables the geographic location of user device 402 to be received by receiver 424 and ultimately delivered to server 410 over a wide area network for subsequent processing and communication by the present system. In operation, satellite 422 detects the global positioning of device 402 and the location is received by receiver 424. Data representing the location of user device 402 is transmitted by receiver 424 to server 410 where mapping functionality is invoked to prepare a visual representation of the device's 402 location. This mapping is then coded according to parameters applied to the message sent by the user that invoked execution of the GPS functional aspects of the system. Specifically, if the initiating message was a green status message sent by a child to a parent, relevant software residing at server 410 will assign a value to the visual representation of the initiator's location that causes the map image sent to the message recipient to appear green. Other features and functionality of the present instant personal emergency messaging system described above may be applied through execution of software modules dedicated to deliver messages according user preference.

Figure 5:
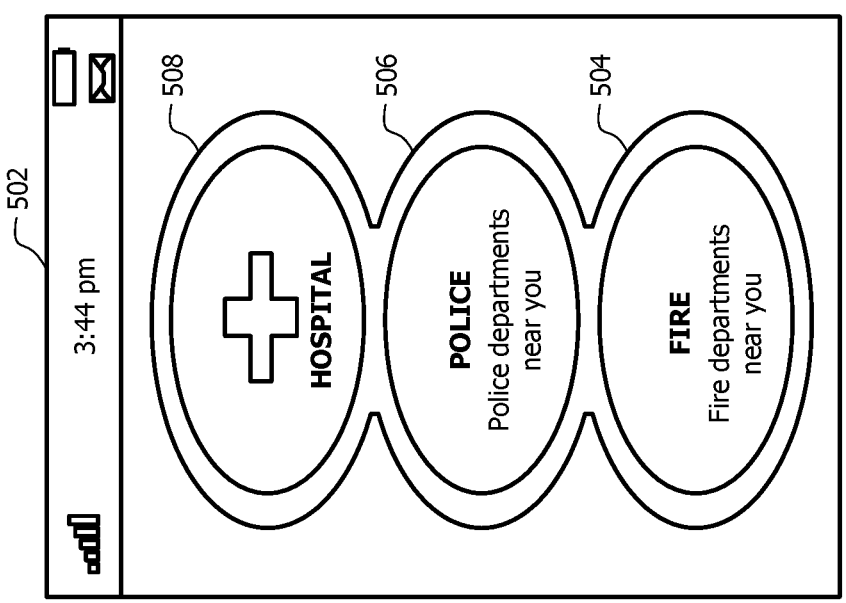
FIG. 5 is a view of the emergency settings feature in one embodiment.

FIG. 5 is a view of the emergency settings feature in one embodiment. In one embodiment, users can initiate the emergency settings feature. The feature can be initiated by various methods, including selecting a feature on the home screen 502, for example, shown on user device 110 via interface 100 of FIG. 1, or swiping or manipulating the home screen to initiate the emergency settings feature.

As depicted, the feature provides access to hospital, police, and fire. The user is presented with icons that the user may swipe on the device interface 100. The fire department icon 504 would cause presentation of information of the nearest fire department. The user swiping of police icon 506 will cause presentation of information of the nearest police station. Similarly, swipe by the user of hospital icon 508 will cause presentation of hospital information. Note, however, that this is for illustrative purposes only and should not be deemed limiting. Other emergency responder units exist which the emergency feature can also provide.

In one embodiment the feature provides the location of the closest hospital, the closest police, the closest fire department, etc. Thus, if a user is in need of a hospital, for example, the application can provide the user with the location, distance, and/or directions to the desired hospitals. In another embodiment the features provides contact information for the closest hospital, police, fire department, etc.

In some embodiments the user's location is sent to a police station, hospital, fire department, etc. Thus, in the event of an emergency, the user's location can be used in rendering emergency services. This can be particularly helpful when the user is not aware of his or her location in sufficient specificity to inform the emergency response team. Accordingly, the user's location can be sent to the emergency response team, and the emergency response team can use the location to locate the user. Further, based on the request, i.e., fire, police, etc., the emergency response team is aware of what services the user is requesting. In one embodiment, the request can include a message. For example, the request can include a message such as "broken leg" or "armed robbery" or other such message which will be useful to the emergency response team in rendering aid.

As noted, in one embodiment the interface comprises a green, yellow, and red color pattern. As noted, "red" may have several meanings. It may mean, "this is a problem" or "this isn't going to work." Further, "red" can indicate an emergency, such as, "I need help." Accordingly, in one embodiment the green, yellow, and red pattern further comprises a "help" or "signal" option to indicate an emergency. With a help, or equivalent option, there is no confusion as to the severity of the situation. The receiver automatically knows that the situation is dire. The signal mode can operate as discussed above. For example, in one embodiment a primary contact is attempted. If the attempt for the primary contact is unsuccessful, the secondary contact will be attempted until a successful message is sent. In other embodiments, however, the user selects which contact will receive the signal.

In one embodiment the signal can comprise customized messages such as "please help," "I'm locked out of my car,", etc. In other embodiments, however, the signal will comprise pre-determined messages. In such embodiments, the user will not have to enter a message and the message will be automatically generated. In some further embodiments, the signal does not comprise a message at all. Instead, the recipient is simply notified that they received a signal from the sender.

Figure 6:
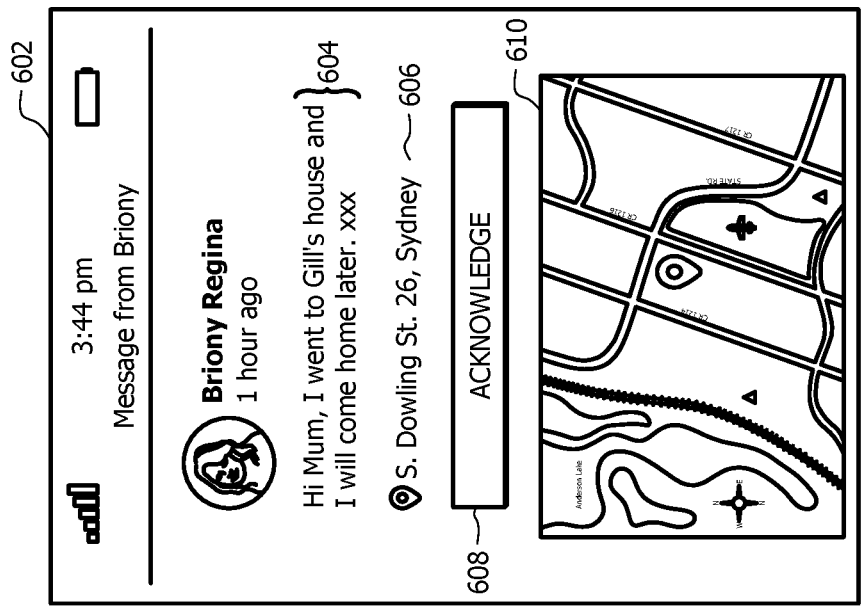
FIG. 6 is a view of a user interface during one embodiment.

FIG. 6 is a view of a user interface 602 during one embodiment. This illustrates one embodiment of the system and method whereby a user, in this case a daughter, can send a notification 604 to a second user, in this case a mother, regarding their location. The message, as depicted, notifies the parent of the daughter's location 606, as well as a message stating when they will arrive back home. The message includes an option for the parent to acknowledge receipt, via depressing acknowledgement key 608. In other embodiments the parent can respond with another message indicating acceptance of the rejection of the request. As can be seen, this single example illustrates the efficient and effective system and method of notifying a second user of the location of the first user. The interface 602 also includes a map area 610 providing a visual indication of the location.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious various thereof is contemplated as falling within the spirit and scope of the disclosed inventions.

The invention claimed is:

1. A computer-implemented method for single action messaging and location confirmation, comprising executing on a processor the steps of:
presenting to a user of a computerized interface a graphical representation of at least two color coded messaging codes indicative of an urgency level of a message;
receiving a user selection of a one of the at least two color coded messaging codes;
delivering via a communication network a message according to the selected color coded messaging code to a first recipient corresponding to the selected color coded messaging code;
delivering via a communication network the message according to the selected color coded messaging code to a second recipient following receipt of an indication that the message according to the selected color coded messaging code was not acknowledged by the first recipient; and
graphically presenting to the second recipient a representation of a geographic location of the user, the graphically presented representation color coded according to the selected color coded messaging code.

2. The computer-implemented method of claim 1, further comprising delivering via a communication network the message according to the selected color coded messaging code to a third recipient following receipt of an indication that the message according to the selected color coded messaging code was not acknowledged by the second recipient.

3. The computer-implemented method of claim 1, wherein the second recipient is identified by the selected color coded messaging code.

4. The computer-implemented method of claim 1, wherein the second recipient is not identified by the selected color coded messaging code.

5. The computer-implemented method of claim 2, wherein the third recipient is identified by the selected color coded messaging code.

6. The computer-implemented method of claim 2, wherein the third recipient is not identified by the selected color coded messaging code.

7. The computer-implemented method of claim 1, wherein the indication that the message according to the selected color coded messaging code was not acknowledged by the first recipient is based on lapse of a predetermined period of delay.

8. The computer-implemented method of claim 1, further comprising graphically presenting to the user a representation of a geographic location of the first recipient, the graphically presented representation color coded according to the selected color coded messaging code.

9. The computer-implemented method of claim 1, wherein the user selects the first recipient and the second recipient via a social network interface.

10. The computer-implemented method of claim 1, wherein the color coded messaging code indicates a health status of the user.

11. A computer-implemented method for single action messaging and location confirmation, comprising executing on a processor the steps of:
presenting to a user of a computerized interface a graphical representation of at least two color coded messaging codes indicative of an urgency level of a message;
receiving a user selection of a one of the at least two color coded messaging codes;
delivering via a communication network the selected color coded messaging code to a first recipient corresponding to the selected messaging code;
delivering via a communication network a message according to the selected color coded messaging code to a second recipient following receipt of an indication that the message according to the selected color coded messaging code was not acknowledged by the first recipient; and graphically presenting to the second recipient a representation of a status of the user, the graphically presented representation color coded according to the selected color coded messaging code.

12. The computer-implemented method of claim 11, further comprising delivering via a communication network the message according to the selected color coded message code to a third recipient following receipt of an indication that the message according to the selected color coded messaging code was not acknowledged by the second recipient.

13. The computer-implemented method of claim 11, wherein the second recipient is identified by the selected color coded messaging code.

14. The computer-implemented method of claim 11, wherein the second recipient is not identified by the selected color coded messaging code.

15. The computer-implemented method of claim 12, wherein the third recipient is identified by the color coded selected messaging code.

16. The computer-implemented method of claim 12, wherein the third recipient is not identified by the selected color coded messaging code.

17. The computer-implemented method of claim 11, wherein the indication that the message according to the selected color coded messaging code was not acknowledged by the first recipient is based on lapse of a predetermined period of delay.

18. The computer-implemented method of claim 11, further comprising graphically presenting to the user a representation of a geographic location of the first recipient, the graphically presented representation color coded according to the selected color coded messaging code.

19. The computer-implemented method of claim 11, wherein the user selects the first recipient and the second recipient via a social network interface.

20. The computer-implemented method of claim 11, wherein the color coded messaging code indicates a security status of the user.

* * * * *